United States Patent [19]

Palliser et al.

[11] Patent Number: 5,992,786
[45] Date of Patent: Nov. 30, 1999

[54] RETRACTOR

[75] Inventors: Martyn N. Palliser, Carlisle, United Kingdom; Stuart Wilson, Egly, France

[73] Assignee: Breed Automotive Technology, Inc., Lakeland, Fla.

[21] Appl. No.: 09/117,164

[22] PCT Filed: Jan. 24, 1998

[86] PCT No.: PCT/GB97/00230

§ 371 Date: Dec. 17, 1997

§ 102(e) Date: Dec. 17, 1998

[87] PCT Pub. No.: WO97/27089

PCT Pub. Date: Jul. 31, 1997

[30] Foreign Application Priority Data

Jan. 25, 1996 [GB] United Kingdom ............... 9601508

[51] Int. Cl.⁶ .................................................. B60R 22/34
[52] U.S. Cl. ............................................................ 242/376.1
[58] Field of Search ............................... 242/376.1, 379; 280/806, 807; 297/475–479

[56] References Cited

U.S. PATENT DOCUMENTS

| 4,136,841 | 1/1979 | Fohl ............................. | 242/376.1 |
| 4,223,853 | 9/1980 | Ernst ............................ | 242/376.1 |
| 4,364,528 | 12/1982 | Yanagihara ................. | 242/376.1 |
| 4,366,934 | 1/1983 | Seifert et al. ............... | 242/376.1 |

FOREIGN PATENT DOCUMENTS

| 7291094 | 11/1995 | Japan . |
| 8080805 | 3/1996 | Japan . |

*Primary Examiner*—John M. Jillions
*Attorney, Agent, or Firm*—Markell Seitzman

[57] ABSTRACT

A vehicle safety restraint retractor comprising a spool (2) for storage of belt webbing (1), the spool being mounted for rotation about its axis (3) within the spool housing (4) the retractor comprising a resilient biasing member (10) urging one end of the spool towards a corresponding cover for the side of the retractor, for taking up axial tolerances in the spool mounting. The resilient biasing member (10) is preferably a wave washer spring positioned at the spring side of the spool, between the spool and the spool arbour cap (9) and covered with a spring cover (7). Such a wave washer reduces axial and radial float of the spool and thus substantially reduces levels of noise in normal operation of the retractor.

2 Claims, 3 Drawing Sheets

RETRACTOR

DESCRIPTION

The present invention relates to a retractor for vehicle safety restraint systems and particularly to noise reduction in such a retractor.

A vehicle safety restraint retractor traditionally comprises a spool assembly onto which belt webbing is wound for storage. The spool rotates about its axis every time the belt is put on by an occupant, during normal wear when the occupant moves about in the seat, e.g. to reach forward for a map or to adjust the radio, and also when the seat belt is unbuckled after use and allowed to retract back onto the spool under action of the retraction return spring. In a crash situation however the retractor locks, preventing pay-out of belt webbing from the spool.

To allow this required movement of the spool, manufacturing tolerances are such that a small axial movement of the spool can occur, particularly when the vehicle rides over an uneven or bumpy road surface. This results in the spool ends impacting against the spool housing end stops with a resultant noise. This noise is becoming less acceptable to car owners.

According to the present invention there is provided a vehicle safety restraint retractor comprising a spool for storage of belt webbing, the spool having an axle; a housing, supporting the spool for rotation about the axle, to pay out and to rewind belt webbing about the spool, the housing having bushings supporting the spool at each end of the axle and there being a cover for each end of the spool axle wherein a resilient biasing member is arranged at one side of the spool to urge the spool axle towards at least one of the covers to take up axial tolerances in the spool mounting.

A retractor can be constructed according to the invention to substantially reduce levels of noise in normal operation.

Preferably the resilient biasing member comprises a wave washer spring and it may advantageously be positioned at the spring end of the spool, for example between the spool and the spool arbour cap, which in turn abuts the spring cover.

The resilient biasing reduces both axial and radial float of the spool thus reducing noise.

For a better understanding of the present invention and to show how the same may be carried into effect reference will now be made to the accompanying drawings in which.

Figure 1:
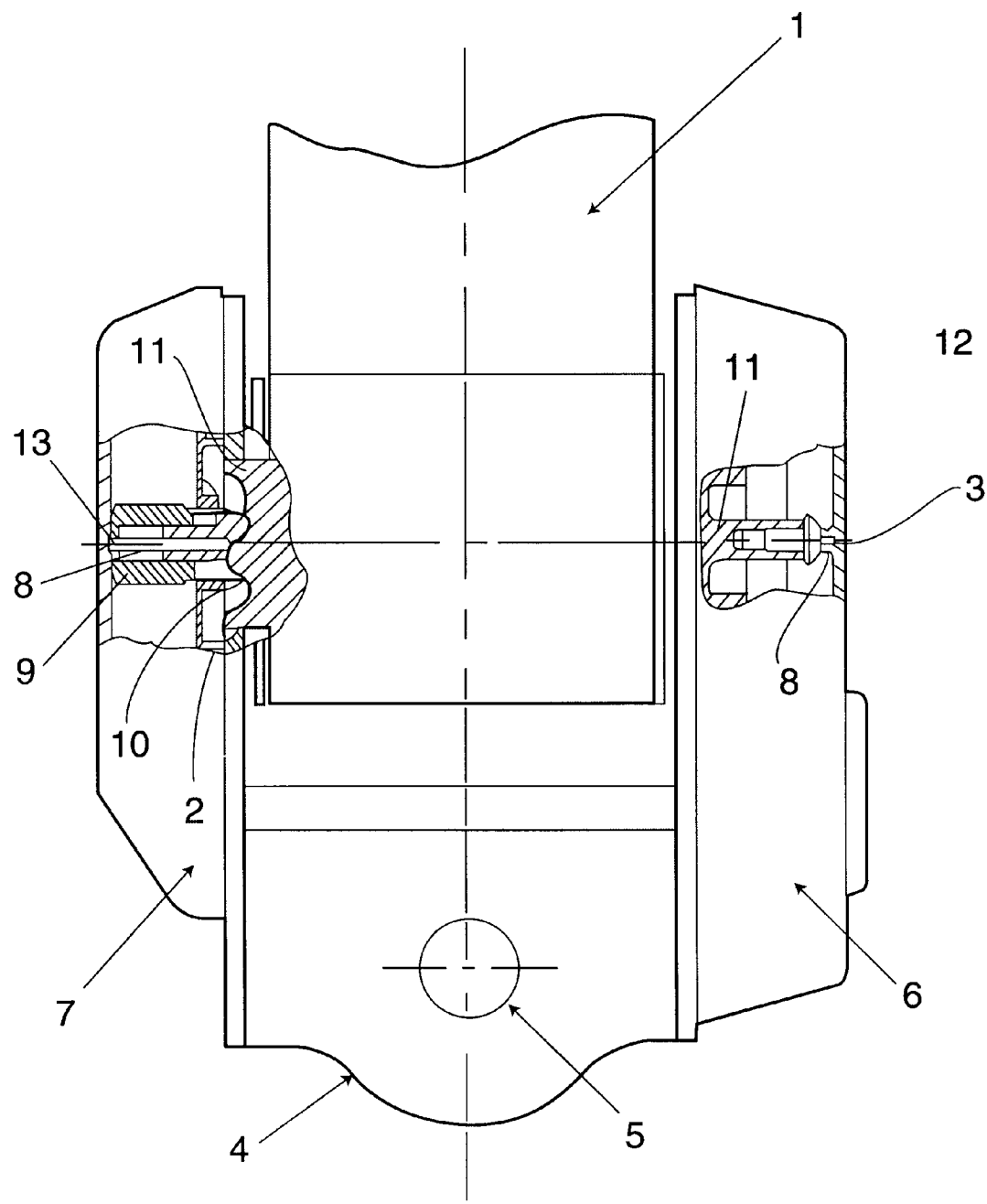
FIG. 1 is a cross-sectional schematic view of a retractor according to the present invention.

FIG. 1 shows belt webbing 1 extending down a side of the vehicle and being wound at one end round spool 2. The spool 2 is mounted for rotation about axis 3 in spool housing or frame 4. The frame 4 is fixed to the vehicle by a bolt (not shown) inserted through fixing hole 5.

On one side (in FIG. 1, the right hand side) of the retractor is located the winding and locking mechanism and the crash sensors (not shown) of well known construction. The mechanism and sensor are protected by mechanism cover 6, and the stub axle 11 extends into this area and is engageable with sliding axial clearance by a pin of the cover 6 engaging a hole in the stub axle 11. The limit of spool travel on this mechanism side is indicated at 12.

At the other side (In FIG. 1, the left hand side) of the spool is located a retraction spring (not shown) which is traditionally a clock spring biasing the spool in a belt rewinding direction. The retraction spring is protected by spring cover 7. The spring side stub axle 11 of the spool 2 is covered by an arbour cap 9 and this abuts the spring cover 7. A wave washer 10 is threaded over the stub 11, concentric with axis 3 between the spring side end of spool 2 and the arbour cap 9. The limit of spool travel on this spring side is indicated at 13.

Figure 2:
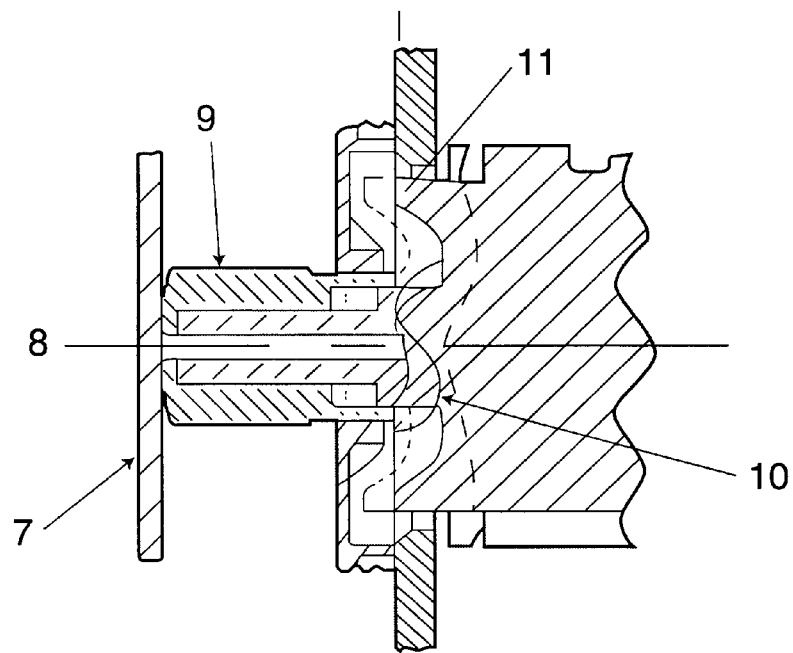
FIG. 2 is an enlarged view of part of FIG. 1.

In FIG. 2 this is shown more clearly: like parts are indicated by like reference numbers. Line A shows the direction of axial movement and of normal variations in tolerances of the spool in normal use. The unbroken lines indicate the spring 10 extended when the spool assembly is in its minimum tolerance condition (minimum axial size) with the spool stub axle 11 abutting the mechanism cover and the arbour 9 abutting the spring cover 7, due to the biasing force from the spring (in this example to the left) and the broken lines indicate the spool assembly is in its maximum tolerance condition (maximum axial size) with the spool 2 again abutting the mechanism cover and the arbour abutting the spring cover 7 (to the right here) with the spring 10 compressed.

Figure 3:
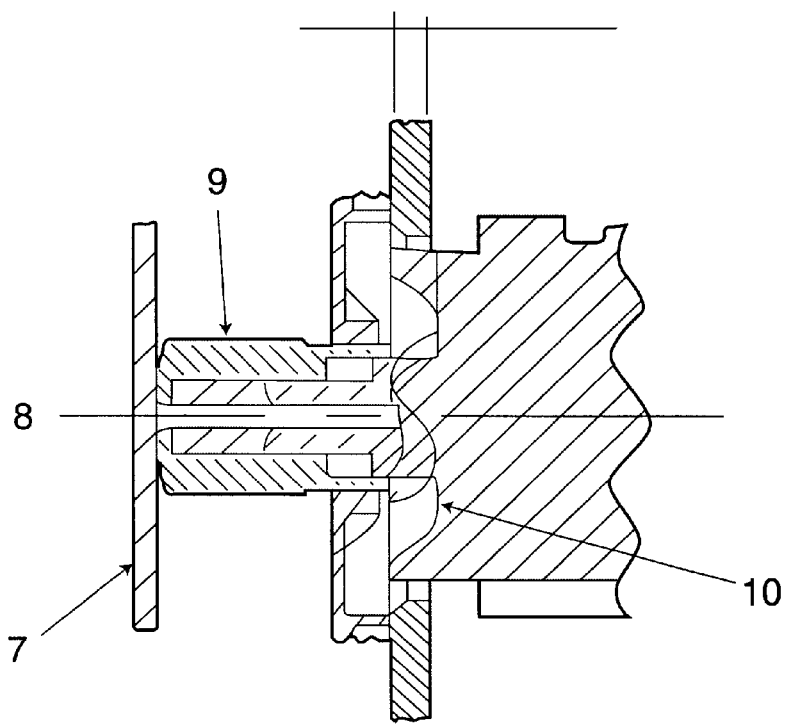
FIGS. 3 and 4 are enlarged views of part of FIG. 1 for different positions of the spool.
Figure 4:
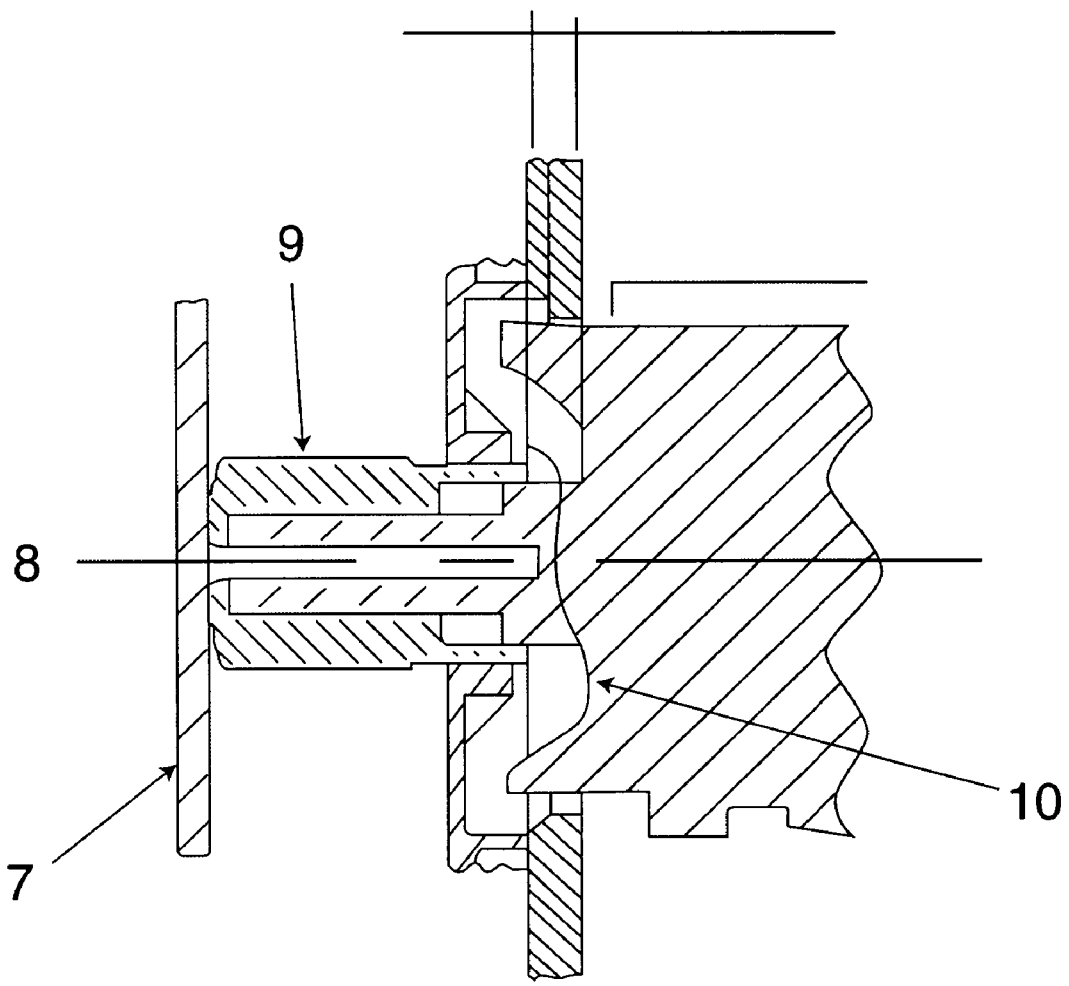

FIGS. 3 and 4 illustrate these tolerances in more detail. Again like parts are referenced accordingly. FIG. 3 corresponds to the solid lines in FIG. 2 and shows the washer 10 in uncompressed form. FIG. 4 corresponds to the broken lines in FIG. 2, and shows the washer in compressed form.

It can be seen that with this arrangement, the arbour cap 9 is in constant contact with the spring cover 7 throughout the full extent of the spool assembly tolerance sizes, ensuring that the spool axial movement is minimised or even eliminated. Thus substantially less noise is generated than would have been the case without the washer 10 in which case the arbour cap would knock against the spring cover and the spool against the mechanism cover.

This invention has the advantage of reducing the radial float of the spool in its housing. This is due to the spring forcing the spool one way and the arbour the other, the friction generated against the mechanism cover and spring cover will reduce radial movement of the spool because more energy will be required to move the spool in the radial directions.

The wave washer 10 effectively takes up the spool float tolerances preventing the axial clearance from being apparent. It could be replaced by a compression spring or any other resilient biasing means though a wave washer is an inexpensive embodiment as such items are widely available in a variety of sizes at very little cost.

The invention is particularly applicable to normal emergency locking retractors but can equally be used with retractors fitted with so called ELR-ALR mechanisms or child hold-out devices for locking baby seats in place or on retractors with pretensioning mechanisms fitted.

We claim:

1. A vehicle safety restraint retractor comprising a spool for storage of belt webbing, the spool having an axle; a housing, supporting the spool for rotation about the axle, to pay out and to rewind belt webbing about the spool, the housing having bushings supporting the spool at each end of the axle and there being a cover for each end of the spool axle wherein a resilient biasing member is arranged at one side of the spool to urge the spool axle in an axial direction towards at least one of the covers to take up axial tolerances in the spool mounting, wherein the resilient biasing member comprises a wave washer spring, located between the spool end and a spool arbour cap.

2. A retractor according to claim 1, comprising a rewind spring arranged at one end of the spool for biasing the spool in a belt rewinding direction, and wherein the resilient biasing member is located at the end of the spool to which the rewind spring is attached.

* * * * *

UNITED STATES PATENT AND TRADEMARK OFFICE
CERTIFICATE OF CORRECTION

PATENT NO. : 5,992,786
DATED : Nov. 30, 1999
INVENTOR(S) : Martyn N. Palliser and Stuart Wilson It is certified that error appears in the above-identified patent and that said Letters Patent is hereby corrected as shown below:

On the Title page, item [22] PCT filed should read --Jan. 24, 1997.--

Signed and Sealed this

Eighth Day of August, 2000

Attest:

Q. TODD DICKINSON

*Attesting Officer*     *Director of Patents and Trademarks*